Aug. 20, 1929.　　　M. LOUGHEAD　　　1,725,286

HOSE AND FITTING

Original Filed Feb. 26, 1923

Inventor
Malcolm Loughead

Patented Aug. 20, 1929.

1,725,286

UNITED STATES PATENT OFFICE.

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA.

HOSE AND FITTING.

Original application filed February 26, 1923, Serial No. 621,223. Divided and this application filed May 2, 1923. Serial No. 636,171.

This application is a division of applicant's application Serial No. 621,223, filed February 26, 1923, now Patent No. 1,461,130, and the invention relates to a fitting for the end of a hose, and particularly to a fitting for the end of a non-expansible hose such as is employed for conveying the fluid to the braking cylinders in an automobile braking system.

The object of the invention is the provision of a fitting for the end of a hose which will be secured thereto in such a manner as not to leak or be blown off when the hose is subjected to high internal pressure, as in the application of the brakes, and particularly to a fitting of this character which will receive the end of the flexible tube or coiled wire inserted within the hose, thus operating to prevent damage to the inner lining of the hose by the end of the tube or coil.

It has been found that fluid actuated braking systems operate most satisfactorily when means are provided to maintain within the system a predetermined volume of fluid and wherein means are provided such that the brakes will be fully operated upon a predetermined movement of the fluid displacing piston. It thus becomes very desirable to provide a fluid conveying medium which avoids the possibility of leakage therefrom of the brake operating fluid, and also a conveying medium which will not expand when subjected to the braking pressure.

A hose which is sufficiently flexible and which is practically non-expansible under braking pressures has been provided by the expedient of inserting within the bore of the hose a length of coiled wire while the hose is being subjected to a pressure somewhat greater than the pressures ordinarily employed when applying the brakes. The pressure applied to the hose acts to expand the hose, and the coil of wire being snugly inserted within the hose while in its expanded condition, when the pressure is removed the hose contracts to snugly engage the exterior of the coil. Thus, when the hose is subsequently subjected to a pressure somewhat less than the pressure when the coil was inserted, it does not expand to any appreciable extent.

If a hose fitting is employed at the end of the hose such as those ordinarily used, the end of the coil inserted within the bore of the hose will be unguarded, and upon repeated flexing of the hose may act to injure the hose lining and thus damage the hose so as to permit the escape of the brake operating fluid. It therefore is desirable that a fitting be provided at the end of the hose which shall receive the end of the coiled wire and prevent it from injuring the hose lining.

It is believed that in the further description of the invention it will be best understood by reference to the accompanying drawings, in which Figure 1 is a sectional view through the portion of the hose fitting which is adapted to receive the end of the hose;

Figure 2:
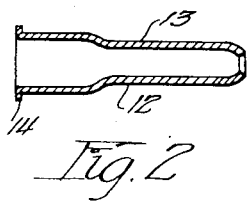
Figure 2 is a similar sectional view through the portion of the fitting which is adapted to be inserted within the bore of the hose.
Figure 1:
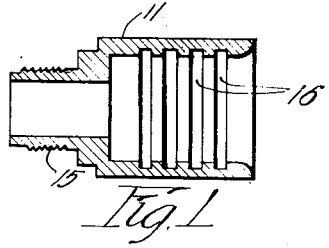
Figure 3:
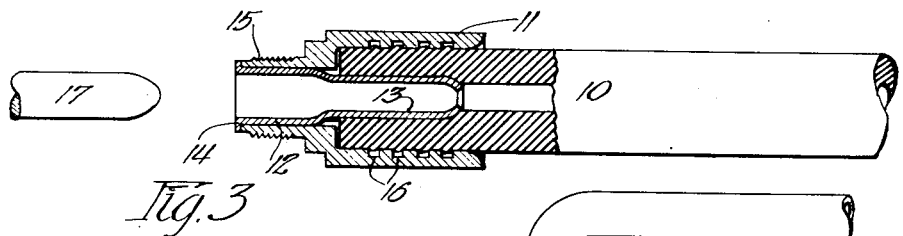
Figure 3 shows the portions of the fitting shown in Figures 1 and 2 assembled in their relation to the hose, and also shows at the left the end of a plunger or punch which is adapted to be inserted within the fitting shown in Figure 2, to expand the same so as to firmly compress the hose between it and the inner portion of the fitting shown in Figure 1.

Referring now to the drawings in which like reference characters indicate like parts in the several views, 10 indicates hose of the fabric and rubber variety, and 11 indicates the external portion of the end fitting which is adapted to snugly receive the end of the hose as indicated in Figure 3. After the end of the hose 10 has been inserted within the fittings 11, a sleeve 12 of ductile material is inserted within the fitting member 11, the reduced portion 13 of the sleeve 12 being inserted within the bore of the hose 10. The portion 13 will preferably be of a size such that it may be readily inserted within the bore of the hose without the use of a great deal of force. The sleeve 12 is provided at the end with the laterally extending flange 14, which is adapted to abut the screw threaded end 15 of the fitting member 11. The fitting 11 is provided on the inner surface thereof with a plurality of annular grooves 16 into which the outer portion of the hose is adapted to be forced by means which will now be described.

Figure 5:
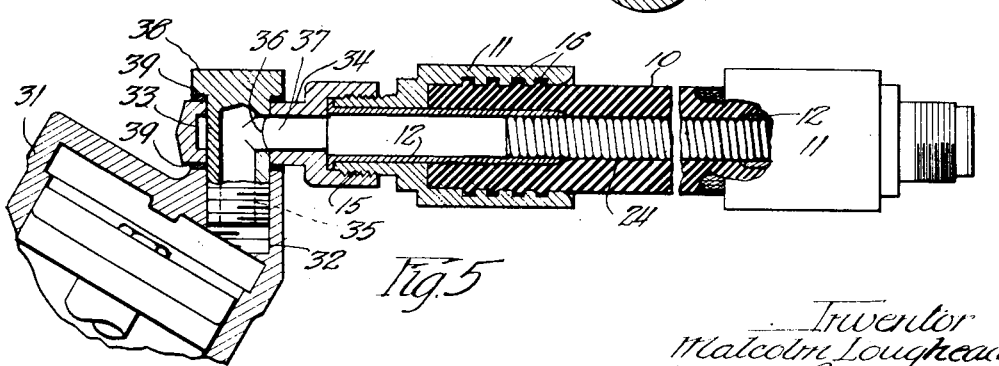
Figure 5 is a longitudinal section through the completed hose and fitting, and also shows the manner of joining the fitting to the brake operating cylinder.

After the fitting members 11 and 12 have been assembled so as to grip the end of the hose as shown in Figure 3, a plunger or punch 17 is forced into the reduced portion 13 of the member 12 so as to expand it to approximately the same size as the portion thereof which is received by the threaded portion 15 of the fitting member 11. In expanding the portion 13 of the fitting 12, the hose is firmly compressed and the outer portions thereof are caused to enter the grooves 16 in the fitting 11, thus the end of the hose is firmly held between the two portions of the fitting in such a manner that it cannot be blown off from the end of the hose when the hose is subjected to pressure. During the expanding process of the portion 13 of the fitting 12, the inner bore thereof is increased so as to be somewhat larger than the bore of the hose 10. It is to be understood that a fitting such as above described will be applied to each end of the hose as indicated in Figure 5.

The manner in which the coiled wire is inserted in the bore of the hose will now be described. The screw threaded end of one of the fittings is inserted within the screw threaded collar 18 at the end of the tube or cylinder 19, within which is slidably mounted the rod or plunger 20. The tube 19 is provided at its end remote from the hose with a stuffing box 21 through which the plunger 20 extends. The plunger 20 is shouldered at 22, the reduced portion 23 thereof being adapted to receive a coiled wire 24. The end of the reduced portion 23 is screw threaded, as indicated at 24', and the follower 25 is adapted to be screwed thereon. The tube 19 is provided with a perforated lug or ear 26 by means of which the device may be firmly supported in any desired manner. Communicating with the bore of the tube 19 is a coupling member 27 which receives the tube 28, which in turn communicates with the source of fluid under pressure. The fluid under pressure may be either liquid or gaseous. The tube 28 is provided with a cut-off 29 whereby the flow of fluid from the pressure source to the bore of the tube 19 may be controlled.

Figure 4:
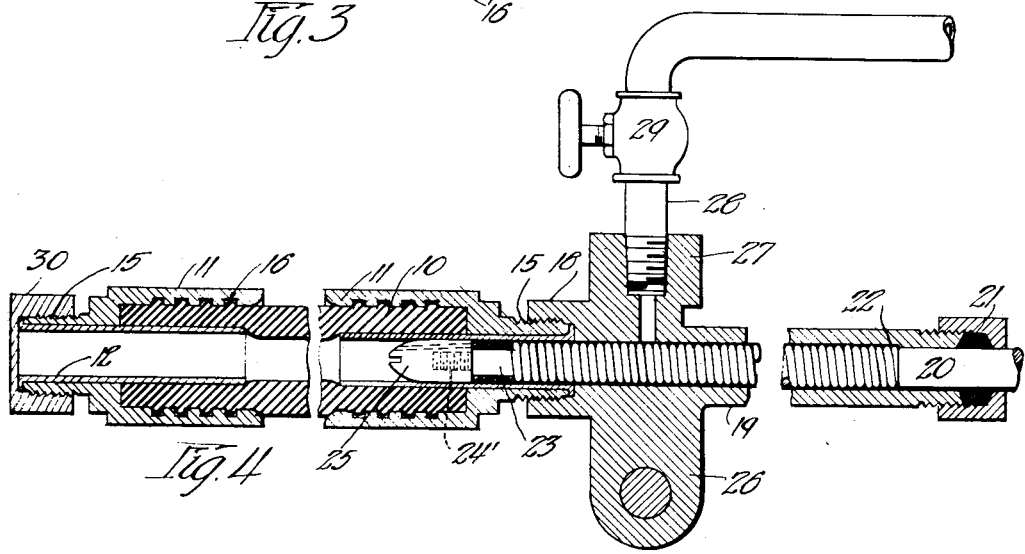
Figure 4 is a longitudinal section through the hose and fitting, showing the fitting in its completed condition and also shows the mechanism employed for inserting the coiled wire within the bore of the hose.

When inserting the coil 24 within the bore of the hose 10, the plunger 20 is withdrawn to the right, as seen in Figure 4, until the shoulder 22 thereof is adjacent to the stuffing box 21. The coil 24 is then placed on the reduceed portion 23 of the plunger and the follower 25 is screwed into position. At this time the follower should occupy a position back of the collar 18. The fitting at one end of the hose 10 is now secured to the collar 18, the opposite end of the hose having previously been closed by means of the coupling shown at the left in Figure 4. The valve 29 is now operated to admit fluid under pressure to the bore of the tube 19 and hence to the bore of the hose 10.

The pressure which is employed for this purpose will vary according to the pressures which it is intended to use in the braking system. We will assume, for sake of illustration, that the brakes are arranged to be actuated by a pressure of substantially five hundred pounds per square inch. Now, if the bore of the hose be subjected to a pressure considerably exceeding five hundred pounds per square inch, say one thousand pounds per square inch, and while the hose is expanded thereby, the coil 24 is snugly inserted within the bore of the hose, when the hose is subsequently subjected to a pressure of five hundred pounds per square inch, it will not be appreciably affected by this lower pressure.

If now when the valve 29 is opened, a fluid under pressure of substantially one thousand pounds per square inch is admitted to the bore of the hose 10 the hose will be expanded. The plunger 20 is now forced toward the left, causing the follower 25 and the coil 24 to travel through the hose bore until the coil reaches a position substantially as indicated in Figure 5. The valve 29 is now actuated to cut off the pressure from the hose, permitting the hose to contract so as to firmly engage the outer surface of the coil. The cap 30 at the end of the hose fitting is now removed, the follower 25 is unscrewed from the threaded portion 24' of the plunger, the plunger is withdrawn from within the coil 24, and the fitting is removed from the collar 18.

As the reduced portions 13 of the fittings 12 were expanded so that the bores thereof were as large as the bore of the hose 10 when expanded, the coil 24 readily enters the bores of the fittings. As the ends of the coil 24 are positioned within the fittings, they act to protect the inner lining of the hose from injury by the ends of the coil.

At the left in Figure 4 is shown the manner of joining the fitting to the brake operating cylinder 31. The brake operating cylinder is provided with a threaded nipple 32 into which is screwed the threaded member 33, which passes through the end of the coupling member 34, threaded onto the portion 15 of the fitting member 11. The member 33 is longitudinally drilled as indicated at 35, and transversely drilled as indicated at 36. The opening 36 communicates with the bore 37 of the coupling member 34. The member 35 is provided with the head 38 which is adapted to be brought into firm engagement with the upper side of the coupling member 34, washers or gaskets 39 being provided between the metallic surfaces to maintain a tight connection.

By the expedient above described, both ends of the coil 24 are positioned within the sleeves of the end fittings, therefore the hose is protected from both ends of the coil. The hose and the end fittings are also tested during the process of inserting the coil within the bore of the hose, as during this process the hose is subjected to a pressure considerably higher than that used in operating the brakes, and any defect in the hose or in the manner of applying the fittings at the end thereof will be discovered when the hose is subjected to the higher pressure preparatory to inserting the coil within it.

While in the drawings and in the above description, applicant has shown but a single set of details, it is to be understood that certain modifications are contemplated and the invention therefore should be limited by the scope of the appended claims.

Having thus described my invention, what I consider is new and desire to secure by Letters Patent in the United States, is:

1. The combination of a hose and an external end member having a large cylindrical opening surrounding the end of the hose and a small cylindrical opening adjacent thereto, and a cylindrical sleeve of uniform diameter having an annular flange engaging the end of the external member, said sleeve fitting within the small cylindrical opening of the external member and extending into the large cylindrical opening, holding the hose in firm engagement with the inner wall of the large cylindrical opening.

2. A hose fitting comprising an external annular member surrounding the end of the hose and having a reduced internal diameter adjacent the end of the hose, and an internal sleeve fitting within the reduced internal diameter of the external member and holding the hose uniformly expanded against the portion of the external member surrounding the hose.

3. The combination with a hose, an external end member having a grooved internal surface surrounding the hose, and an internal sleeve uniformly expanding the internal diameter of the hose causing the thickness of the hose to be greater at the grooves of the external member.

4. The combination of a hose, a member surrounding the end of the hose provided with an irregular internal surface, an internal rigid sleeve maintaining the hose expanded and forcing material of the hose into the irregularity of the surrounding member, and flexible means extending into the sleeve for maintaining the hose radially expanded and under a predetermined tension adjacent the sleeve.

5. The combination of a hose, a flexible member for maintaining the hose expanded under a predetermined tension, a sleeve having a smooth surface inserted in the end of the hose and over said flexible member, said sleeve having a tapering end forming a gradual incline for the hose from the flexible member to the sleeve, and an external coupling member for retaining the hose on the sleeve.

6. The combination, with a substantially non-expansible hose, of an external end member provided with an internal groove, an expanded thimble having a uniform diameter for clamping the hose against the external member and a radially extending flange integral with the end of the thimble engaging the end of the external member and forming an extension thereof.

In witness whereof, I hereunto subscribe my name this 25th day of April, 1923.

MALCOLM LOUGHEAD.